United States Patent [19]

Aonuma et al.

[11] 4,246,316
[45] Jan. 20, 1981

[54] MAGNETIC RECORDING MEDIUM

[75] Inventors: Masashi Aonuma; Yasuo Tamai, both of Odawara, Japan

[73] Assignee: Fuji Photo Film Co., Ltd., Minami-ashigara, Japan

[21] Appl. No.: 887,766

[22] Filed: Mar. 17, 1978

Related U.S. Application Data

[63] Continuation of Ser. No. 737,164, Oct. 29, 1976, abandoned.

[30] Foreign Application Priority Data

Nov. 5, 1975 [JP] Japan ................................ 50-132124

[51] Int. Cl.$^3$ ............................................. H01F 1/06
[52] U.S. Cl. ............................... 428/329; 75/0.5 AA; 75/0.5 BA; 148/105; 360/131; 360/134; 427/131; 427/132; 427/204; 428/336; 428/377; 428/539; 428/900
[58] Field of Search .............................. 360/131, 134; 75/0.5 AA, 0.5 A, 0.5 BA, 0.5 R; 148/105, 31.55, 31.57; 427/131, 132, 204; 428/336, 403, 407, 900, 329, 336, 337, 339, 212, 539

[56] References Cited

U.S. PATENT DOCUMENTS

| | | | |
|---|---|---|---|
| 2,643,130 | 6/1953 | Kornei | 360/131 |
| 2,694,656 | 11/1954 | Cumnas | 428/900 |
| 2,711,901 | 6/1955 | Von Behren | 428/900 |
| 3,149,996 | 9/1964 | Wagner et al. | 360/131 |
| 3,185,775 | 5/1965 | Camras | 360/134 |
| 3,206,338 | 9/1965 | Miller et al. | 75/0.5 AA |
| 3,567,525 | 3/1971 | Graham et al. | 75/0.5 AA |
| 3,661,556 | 5/1972 | Jolley et al. | 75/0.5 AA |
| 3,761,311 | 9/1973 | Perrington et al. | 360/134 |
| 3,767,464 | 10/1973 | Akushi et al. | 360/134 |
| 3,790,407 | 2/1974 | Merten et al. | 360/134 |
| 4,063,000 | 12/1977 | Aonuma et al. | 428/900 |
| 4,109,046 | 8/1978 | Hammon et al. | 428/900 |

FOREIGN PATENT DOCUMENTS

2149713  4/1972  Fed. Rep. of Germany ........... 360/134

*Primary Examiner*—Stanley S. Silverman
*Attorney, Agent, or Firm*—Armstrong, Nikaido, Marmelstein & Kubovcik

[57] ABSTRACT

This invention relates to a magnetic recording medium comprising a non-magnetic support and magnetic layer provided thereon containing a ferromagnetic metal powder, the magnetic layer having a multilyaer structure consisting of a lower layer containing acicular grains obtained by dry process reduction and an upper layer containing chain-like grains obtained by wet process reduction, the upper layer being provided on the lower layer. This magnetic recording medium is particularly suitable for high density recording.

11 Claims, No Drawings

MAGNETIC RECORDING MEDIUM

This is a continuation of application Ser. No. 737,164, filed Oct. 29, 1976, now abandoned.

BACKGROUND OF THE INVENTION

1. Field of the Invention

This invention relates to a magnetic recording medium and more particularly, it is concerned with a magnetic recording medium suitable for high density recording.

2. Description of the Prior Art

Ferromagnetic powders which have hitherto been used for magnetic recording media are maghemite, cobalt-doped maghemite, magnetite, cobalt-magnetite Berthollide compounds of maghemite and magnetite, cobalt-doped Berthollide compounds of maghemite and magnetite and chromium dioxide. However, these oxide-type ferromagnetic powders are not so suitable for magnetic recording of a signal of short recording wavelength (about 2 μm or less) or for magnetic recording with a narrow track width (about 100 μm or less) because their magnetic properties such as coercive force (Hc) and residual magnetic flux density (Br) are insufficient for high density recording.

Development of ferromagnetic powders having properties suitable for high density recording has lately been carried out vigorously and one of these material is a ferromagnetic metal powder.

The following methods are known as a method of preparing such a ferromagnetic metal powder:

(1) A method comprising heat-decomposing an organic acid salt of a ferromagnetic metal and reducing with a reducing gas, which is described in, for example, Japanese Patent Publication Nos. 11412/1961, 22230/1961, 14809/1963, 3807/1964, 8026/1965, 8027/1965, 15167/1965, 16899/1965, (U.S. Pat. No. 3,186,829), 12096/1966, 14818/1966 (U.S. Pat. No. 3,190,748), 24032/1967, 3221/1968, 22394/1968, 29268/1968, 4471/1969, 27942/1969, 38755/1971, 4286/1971, 38417/1972, 41158/1972, 29280/1973 and Japanese Patent Application (OPI) No. 38523/1972.

(2) A method comprising reducing an acicular iron oxyhydride, acicular iron oxyhydride containing another metal or acicular iron oxide derived from these oxyhydrides, which is described in, for example, Japanese Patent Publication Nos. 3862/1960, 11520/1962, 20335/1964, 20939/1964, 24833/1971, 29706/1971, 30477/1972 (U.S. Pat. No. 3,598,568), 39477/1972, 24952/1973, 7313/1974, Japanese Patent Application (OPI) Nos. 5057/1971 (U.S. Pat. No. 3,634,063), 7153/1971, 38525/1972, 79153/1973, 82395/1973, 97738/1974, U.S. Pat. Nos. 3,607,219, 3,607,220 and 3,702,270.

(3) A method comprising evaporating a ferromagnetic metal in a low pressure inert gas, which is described in, for example, Japanese Patent Publication Nos. 25620/1971, 4131/1972, 27718/1972, Japanese Patent Application (OPI) Nos. 25662–25665/1973, 31166/1973, 55400/1973, 81092/1973, Japanese Patent Publication Nos. 15320/1974 and 18160/1974.

(4) A method comprising heat-decomposing a metal carbonyl, which is described in, for example, Japanese Patent Publication Nos. 1004/1964, 3415/1965, 16868/1970, 26799/1974, U.S. Pat. Nos. 2,983,997, 3,172,776, 3,200,007 and 3,228,882.

(5) A method comprising electrodepositing a ferromagnetic metal powder using a mercury cathode and then separating the metal powder from mercury, which is described in, for example, Japanese Patent Publication Nos. 12910/1960, 3860/1961, 5513/1961, 787/1964, 15525/1964, 8123/1965, 9605/1965 (U.S. Pat. No. 3,198,717), 19661/1970 (U.S. Pat. No. 3,156,650) and U.S. Pat. No. 3,262,812.

(6) A method comprising reducing a solution containing a ferromagnetic metal salt with a reducing agent, which is described in, for example, Japanese Patent Publication Nos. 20520/1963, 26555/1963, 20116/1968, 9369/1970, 14934/1970, 7820/1972, 16052/1972, 41718/1972, 41719/1972 (U.S. Pat. No. 3,607,218), Japanese Patent Application (OPI) Nos. 1353/1972 (U.S. Pat. No. 3,756,866), 1363/1972, 42252/1972, 42253/1972, 44194/1973, 79754/1973, 82396/1973, U.S. Pat. Nos. 3,206,338, 3,494,760, 3,535,104, 3,567,525, 3,661,556, 3,663,318, 3,669,643, 3,672,867, 3,726,664, Japanese Patent Application Nos. 91498/1973, 92720/1973, 106901/1974 and 134467/1974.

In these methods for the production of ferromagnetic metal powders, the ferromagnetic metal powders obtained by reducing in a reducing gaseous stream as in the case of (1) or (2) have an acicular grain form and a grain size of 200 to 1000 Å in short length axial ratio being within a range of 3 to 20, which are suitable for use as a magnetic recording medium. There are formed sometimes pores in the grains depending on the feature of the production method. Ferromagnetic metal powders are readily be obtained having a coercive force (which will hereinafter be referred to as "Hc") of 400 to 1500 Oe and a saturated magnetization (which will hereinafter be referred to as "σs") of 100 to 180 emu/g. In the above described methods (3), (4), (5) and (6), ferromagnetic metal powders are obtained in such a manner that globular or granular grains are arranged at a constant interval with some orientation or contacted with each other because a magnetic field is applied to the ferromagnetic powder during the production thereof, and sometimes these grains are orientated in an irregular state. In any case, these grains are chained like a necklace, which are called "chain grains", and those having magnetic properties such as Hc of 300 to 2000 Oe and σs of 70 to 140 emu/g are readily obtainable. As a grain size, a grain diameter of 150 to 800 Å and grain length of 500 to 10000 Å are desirable for magnetic recording media.

Magnetic recording media using the above described acicular grains alone have the following disadvantages:

(1) The squareness ratio (Br/Bm, hereinafter referred to as "SQ") is low and it is difficult to obtain a practical squareness ratio, i.e., 0.75 or more. Therefore, the self-demagnetization is large and a high sensitivity (5 MHz VS) cannot be obtained in spite of a large Bm (maximum magnetic flux density).

(2) The dispersibility with binders and the surface smoothness of a tape prepared using these grains are so bad that there are much noise and a low S/N (signal/noise) ratio.

(3) Head abrasiveness is large.

On the other hand, magnetic recording media using the above described chain grains alone have the following disadvantages:

(1) The saturated magnetization is smaller than when using the acicular grains.

(2) The apparent density is small and handling of the grains is hard. Therefore, a tape prepared using the chain grains should be subjected to supercalendering treatment because of its soft surface.

(3) The cost for the production thereof is higher than when using the acicular grains.

(4) The durability to contact with heads is shorter.

Various studies or efforts have hitherto been made on both the grains in order to solve the above described problems, but these problems have not been solved completely, which hinder practical use of these grains.

We, the inventors, have made efforts to provide a magnetic recording medium free from the above described disadvantages and consequently have reached the present invention, in particular, getting a hint from the prior art magnetic recording media having two or more different layers as magnetic layers.

Magnetic recording media having a multi-layer structure, for example, consisting of a $\gamma$-$Fe_2O_3$ layer coated on a $Fe_3O_4$ powder layer are well known whereby the disadvantages of $Fe_3O_4$, i.e., oxidation in air or poor reprinting property can be solved with keeping the high magnetic flux density of $Fe_3O_4$. It is also known that the disadvantage of $CrO_2$, i.e., head abrasiveness can be improved by the provision of a multilayer structure consisting of a $CrO_2$ type magnetic layer and iron oxide magnetic layer coated thereon and that the sensitivity can be increased and the harmonic distortion factor and S/N property can be improved by the provision of a multilayer layer consisting of a plurality of layers differing in coercive force.

These known facts are disclosed in, for example, Utility Model Publication No. 18135/1959, Japanese Patent Publication Nos. 2218/1962, 8106/1964, 23678/1964, 5351/1965, 185/1968, 28681/1973, Japanese Patent Application (OPI) Nos. 18508/1972, 37903/1972, 31907/1973, 39995/1973, 81093/1973, 98803/1973, 55304/1974 and U.S. Pat. Nos. 2,643,130, 2,647,954, 2,691,072, 2,941,901, 3,052,567, 3,185,775, 3,328,195, 3,416,949, 3,676,217 and 3,761,311.

SUMMARY OF THE INVENTION

It is an object of the invention to provide a new magnetic recording medium suitable for high density recording.

It is another object of the invention to provide a magnetic recording medium whereby the above described disadvantages of the prior art can be solved.

It is a further object of the invention to provide a magnetic recording medium having a multilayer structure.

These objects can be attained by a magnetic recording medium comprising a non-magnetic support and a magnetic layer provided thereon containing a ferromagnetic metal powder, the magnetic layer having a multilayer structure consisting of a lower layer containing acicular grains obtained by dry process reduction and an upper layer containing chain-like grains obtained by wet process reduction, the upper layer being provided on the lower layer.

DETAILED DESCRIPTION OF THE INVENTION

We, the inventors, have found as a result of our studies that a magnetic recording substance has the following advantages, which is obtained by providing on a nonmagnetic support member a magnetic layer containing acicular grains obtained by dry process reduction (which layer will hereinafter be referred to as "lower layer") and providing on the lower layer another magnetic layer containing chain-like grains obtained by wet process reduction (which layer will hereinafter be referred to as "upper layer") and consequently have reached the present invention.

(1) The head abrasiveness and S/N ratio can be more improved as compared with magnetic recording media using acicular grains alone.

(2) The sensitivity is higher than that of magnetic recording media using chain-like grains or acicular grains alone.

(3) The cost is lower than that of magnetic recording media using chain-like grains alone, because the quantity of chain-like grains used can be decreased in the magnetic recording medium of the present invention.

(4) The durability can be more improved by incorporating acicular grains in the lower layer as compared with magnetic recording media using chain grains only. This is possibly due to that the elasticity of the magnetic layer is increased by the acicular grains of the lower layer.

The magnetic recording substance of the present invention has of course the known advantages or effects as a multilayer structure in addition to the above described advantages.

In the magnetic recording substance of the present invention, acicular grains used for the lower layer have a grain size of short axis 200 to 1000 Å and axial ratio 3 to 30 and magnetic properties of Hc 400 to 1500 Oe, $\sigma$s 100 to 180 emu/g and SQ 0.4 or more and chain-like grains used for the upper layer have a grain size of grain diameter 150 to 800 Å and mean length 500 to 10000 Å and magnetic properties of Hc 600 to 2000 Oe, $\sigma$s 80 to 140 emu/g and SQ 0.45 or more.

The thickness of the upper layer or lower layer can be optionally chosen depending on the intended use of the magnetic recording medium. The thickness of the upper layer is generally 6 microns or less and preferably 0.2 to 4.5 microns for high density recording. If the thickness exceeds the upper limit, the thickness loss becomes large and the sensitivity tends to lower during recording of short wavelength. The thickness of the lower layer is generally 12 microns or less and preferably 0.5 to 8 microns for high density recording. It is desirable that the thickness of the upper layer is smaller than that of the lower layer and, in particular, if half or less of that of the lower layer.

In each of the upper layer and lower layer, the orientation direction of a magnetic substance should be chosen within the known variable range depending on the use of the magnetic recording medium. The coercive force of the upper layer is preferably larger, in particular, at least 200 Oe larger than that of the lower layer. In the upper layer, furthermore, a saturated magnetization (Gause) to coercive force (Oe) ratio is preferably 5 or less.

It is further found that, when the grains of the upper layer are exchanged for those of the lower layer, that is to say, acicular grains are used for the upper layer and chain-like grains are used for the lower layer, the magnetic recording medium can be applied to a special use such for example as requiring a durability but not requiring an electromagnetic conversion property so much, but is not effective for high density magnetic recording.

The acicular grains or particles, for example, ferromagnetic metal powders consisting mainly of iron, cobalt, cobalt-nickel alloys, iron-cobalt alloys, iron-nickel alloys and iron-nickel-cobalt alloys are prepared by the foregoing method (1) or (2) as well known in the art. These ferromagnetic metal powders are prepared, for example, by heat decomposing an organic acid salt such as oxalate of a ferromagnetic metal and then reducing with a reducing gas such as hydrogen gas or reducing an acicular oxyhydroxide of iron optionally with another metal such as cobalt, nickel, manganese or chromium or acicular iron oxide obtained from such an oxyhydroxide with a reducing gas such as hydrogen gas.

The chain-like grains or particles are prepared by the foregoing method (3), (4), (5) or (6). A more feasible method is the method (6), that is, comprising reducing a solution containing a ferromagnetic metal salt with a reducing agent. As the reducing agent, there can be used, for example, acids or salts containing phosphinate ion, borohydride compounds or their derivatives such as sodium borohydride and diethylaminoborane, other hydrides, hydrazine or its derivatives. When using a reducing agent containing phosphinate ion, the resulting ferromagnetic metal powder contains 0.1 to 10% by weight of phosphorus and when using a borohydride compound as a reducing agent, the resulting ferromagnetic metal powder contains 0.1 to 10% by weight of boron. The chain-like grains contain, as a main component, iron, cobalt, iron-cobalt, cobalt-nickel, iron-nickel, or iron-cobalt-nickel and further 10% by weight or less of at least one element selected from the group consisting of lead, titanium, manganese, boron, phosphorus, sulfur, copper, tin, aluminum, silicon, zinc, molybdenum, palladium, silver, barium, lanthanum, cerium and samarium. Both the acicular grains and chain grains contain generally 75% by weight or more, preferably 80% by weight or more of metallic components.

In the present invention, the acicular grains and chain-like grains obtained by the above described methods are individually dispersed in binders and mixed with organic solvents to prepare magnetic coating compositions. Firstly, the coating composition of acicular grain type is applied to a substrate or support and dried to form a magnetic layer as a lower layer. Then the other magnetic coating composition of chain grain type is applied to the lower layer and dried to form another magnetic layer as an upper layer, thus obtaining a magnetic recording medium. Surface smoothening treatment of the dried magnetic layer is important and it is effective in order to obtain a magnetic recording medium with an excellent surface smoothness to subject the lower layer coated and dried in this way to a surface smoothening treatment and thereafter coat with the upper layer. A surface smoothening treatment can be carried out after the lower layer and upper layer are provided.

Methods of producing the magnetic coating compositions used in the present invention are described in detail in Japanese Patent Publication Nos. 186/1968, 28043/1972, 28045/1972, 28046,1972, 28048/1972 and 31445/1972. The magnetic coating compositions described in these publications comprise ferromagnetic metal powders, binders and coating solvents, as main components, optionally with other additives such as dispersing agents, lubricants, abrasives, antistatic agents, etc.

Suitable binders which can be used in the present invention include hitherto known thermoplastic resins, thermosetting resins and mixtures thereof.

Suitable thermoplastic resins are those which have a softening point of about 150° C. or less, a mean molecular weight of about 10,000 to 200,000 and a degree of polymerization of about 100 to 2,000, for example, vinyl chloride-vinyl acetate copolymer, vinyl chloride-vinylidene chloride copolymer, vinyl chloride-acrylonitrile copolymer, acrylate-acrylonitrile copolymer, acrylate-vinylidene chloride copolymer, acrylate-styrene copolymer, methacrylate-acrylonitrile copolymer, methacrylate-vinylidene chloride copolymer, methacrylate-styrene copolymer, urethane elastomer, polyvinyl fluoride, vinylidene chloride-acrylonitrile copolymer, butadiene-acrylonitrile copolymer, polyamide resin, polyvinyl butyral, cellulose derivatives such as cellulose acetate butyrate, cellulose diacetate, cellulose triacetate, cellulose propionate, cellulose nitrate and the like, styrene-butadiene copolymer, polyester resin, chlorivinyl ether-acrylate copolymer, amino resin, various synthetic rubber based thermoplastic resins and mixtures thereof.

Suitable examples of these resins which can be used are described in Japanese Patent Publication Nos. 6877/1962, 12628/1964, 5349/1965, 20907/1965, 9463/1966, 14059/1966, 19685/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition and the like. Of these resins, preferred resins are those which do not soften or melt before the resin thermally decomposes. Typical examples of these resins are phenol resins, epoxy resins, polyurethane hardening type resins, urea resins, melamine resins, alkyd resins, silicone resins, alkyd based reactive resins, epoxy-polyamide resins, mixtures of high molecular weight polyester resins and isocyanate prepolymers, mixtures of methacrylic acid salt copolymers and diisocyanate prepolymers, mixtures of polyesterpolyols and polyisocyanates, urea-formaldehyde resins, mixtures of low molecular weight glycerois, high molecular weight diols and triphenylmethane triisocyanate, polyamine resins and mixtures thereof.

Suitable examples of these resins which can be used are described in Japanese Patent Publication Nos. 8103/1964, 9779/1965, 7192/1966, 8016/1966, 94275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc.

These binders can be used individually or in combination with each other and other additives can be added to the binders.

The mixing proportion of a ferromagnetic metal powder and binder is 10 to 400 parts by weight of the binder, preferably 15 to 100 parts by weight of the binder per 100 parts by weight of the ferromagnetic metal powder.

In addition to the above described binders are ferromagnetic metal powders, other additives such as dispersing agent, lubricants, abrasives, antistatic agents, rust inhibitors, etc. may be added to a magnetic recording layer.

Suitable dispersing agents are fatty acids containing about 12 to 18 carbon atoms (e.g., having the formula $R_1COOH$ where $R_1$ is an alkyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and sulfuric acid esters thereof can be used. These dispersing agents are generally employed in a proportion of 1 to 20 parts by weight to 100 parts by weight of the binder.

Suitable lubricants which can be used include silicone oils, carbon black, graphite, carbon black grafted polymers, molybdenum disulfide, tungsten disulfide, fatty acid esters produced from monobasic fatty acids having 12 to 16 carbon atoms and monohydric alcohols having 3 to 12 carbon atoms and fatty acid esters produced from monobasic fatty acids having 17 or more carbon atoms and monohydric alcohols which carbon atoms amount to 21 to 23 when summed up with the number of carbon atoms of the fatty acids. These lubricants are generally used in a proportion of about 0.2 to 20 parts by weight per 100 parts by weight of the binder. These lubricants are described in Japanese Patent Publication No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539, 3,687,725, *IBM Technical Disclosure Bulletin*, Vol. 9, No. 7, page 779 (December 1966), and *ELEKTRONIK*, No. 12, page 380 (1961), West Germany.

Typical abrasives which can be used include materials generally used, e.g., fused alumina, silicon carbide, chromium oxide, corundum, synthetic corundum, diamond, synthetic diamond, garnet, emery (main component: corundum and magnetite), and the like. These abrasives are used which have a mean particle size of about 0.05 to 5 μm, preferably about 0.1 to 2 μm. These abrasives are generally used in a proportion of from about 7 to 20 parts by weight per 100 parts by weight of the binder. These abrasives are described in Japanese Patent Application No. 26749/1973, U.S. Pat. Nos. 3,007,307, 3,041,196, 3,293,066, 3,630,910 and 3,687,725, British Patent No. 1,145,349 and West German patent (DT-OS) No. 853,211 and 1,001,000.

Suitable antistatic agents which can be used in the present invention include natural surface active agents such as saponin; nonionic surface active agents such as alkylene oxide type, glycerine type and glycidol type surface active agents; cationic surface active agents such as higher alkylamines, quaternary ammonium salts, pyridine or other heterocyclic compounds, phosphonium compounds and sulfonium compounds; anionic surface active agents such as containing acid groups, e.g., carboxylic acid groups, sulfonic acid groups, phosphoric acid groups, sulfate groups or phosphate groups; and amphoteric surface active agents such as amino acids, aminosulfonic acids and sulfuric acid or phosphoric acid esters of amino alcohols.

Examples of the surface active agents that can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,294,540, 3,415,649, 3,441,413, 3,442,654, 3,475,174, 3,545,974, West German Patent Application (OLS) No. 1,942,665, British Pat. Nos. 1,077,317, 1,198,450, Ryohei Oda et al.: *Kaimen Kassei Zai no Gosei to so no Oyo* (*Synthesis of Surface Active Agents and their Applications*), Maki Shoten, Tokyo (1964), A. M. Schwarts et al.: *Surface Active Agents*, Interscience Publications Corp., New York (1958), J. P. Sisley et al.: *Encyclopedia of Surface Active Agents*, Vol. 2, Chemical Publishing Co., New York (1964), and *Kaimen Kassei Zai Binran* (*Handbook of Surface Active Agents*), 6th Ed., Sangyo Tosho Co., Tokyo, Dec. 20, 1966.

These surface active agents can be used individually or in combination with each other. These surface active agents are generally used as antistatic agents, but in some cases, they are used for other purposes, for example, for improving dispersibility, magnetic property and lubricity, or as coating aids.

The thickness of a support which can be used in the present invention is generally about 5 to 50 μm, preferably about 10 to 40 μm. If the thickness is less than about 5 μm, the tensile strength of the support required as a magnetic recording material decreases and the support tends to break or deform. If the thickness exceeds about 50 μm, the volume and weight of a magnetic recording material increase and therefore, the recording density per unit volume or weight decreases. Suitable materials of such a support are polyesters such as polyethylene terephthalate and polyethylene-2,6-naphthalate, polyolefins such as polypropylene, cellulose derivatives such as cellulose triacetate and cellulose diacetate, polycarbonates, polyamides, polyimides, polyamideimides and the like. In some cases, a rigid support material, for example, metallic material is suitably used depending on the intended use.

The above described support can be subjected to the so-called back coating at the opposite surface to a magnetic layer provided thereon, for the purpose of preventing charging, magnetic reprint and so on. Suitable back coating techniques which can be used are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688. The support is in any form of tapes, sheets, cards, disks, drums, etc. and various materials can optionally be chosen depending on the form of the support.

The magnetic recording layers can be coated onto a support using coating methods such as air doctor coating, blade coating, air knife coating, squeeze coating, dip coating, reverse roll coating, transfer roll coating, gravure coating, kiss coating, cast coating, spray coating and the like, and other methods can be also used. These coating methods are described in *Coating Kogaku* (*Coating Engineering*), pages 253 to 277, published by Asakura Shoten, Tokyo (Mar. 20, 1971).

Useful organic solvents which can be used in the present invention include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like; tetrahydrofuran, dimethyl sulfoxide, etc. and these solvents can be used individually or in combination with each other.

The magnetic layer coated onto a support by the above described coating method is dried after, if desired, the coating has been subjected to a treatment for orientating the magnetic powder in the layer. Suitable treatments for orientating the magnetic powder in the layer are disclosed in U.S. Pat. Nos. 1,949,840, 2,796,359, 3,001,891, 3,172,776, 3,416,948, 3,473,960, and 3,681,138 and Japanese Patent Publication Nos. 3427/1957, 28368/1964, 23624/1965, 23625/1965, 13181/1966, 13043/1973 and 39722/1973. If necessary, the magnetic layer can be subjected to a surface-smoothening treatment or cut in a desired shape, thereby to form the magnetic recording material of the invention. Suitable surface-smoothening techniques are disclosed in U.S. Pat. Nos. 2,688,567, 2,998,325 and 3,783,023 and German Patent Application (OPI) No. 2,405,222.

In the above described orientating treatment for the magnetic layer, the orientating magnetic field can be either an AC or DC magnetic field with a field strength of about 500 to 2000 gauss. The drying temperature can range from about 50° to about 100° C. and the drying time is about 3 to 10 minutes. These treatments are disclosed in Japanese Patent Publication Nos. 28368/1964 and 23625/1965 and U.S. Pat. No. 3,473,960. The method described in Japanese Patent Publication No. 13181/1966, in particular, is considered to be a fundamental and important technique.

The advantages or effects of the present invention are summarized below:

(1) A magnetic recording substance or medium having a high sensitivity and high S/N ratio can be obtained.

(2) A magnetic recording medium well balanced in sensitivity, S/N, durability, surface smoothness and head abrasiveness can be obtained.

(3) Such a magnetic recording medium can be produced with a relatively low cost.

(4) Such a magnetic recording medium is suitable for high density recording (speed lowered, compacted).

The present invention will be explained in detail with reference to the following examples. It will be obvious to one skill in the art that various changes and modifications can be made in the components, ratios, operational orders and the like without departing from the spirit of the present invention. Therefore, the present invention should not be construed as being limited to the following examples. All parts, percents, ratios and the like are to be takes as those by weight unless otherwise indicated.

EXAMPLE 1

Cobalt-adsorbed goethite was subjected to a heat treatment to form an acicular Fe-Co oxide, then reduced with a hydrogen stream at a high temperature, cooled and surface treated with sodium oleate to obtain an acicular ferromagnetic Fe-Co powder designated hereinafter as acicular grains or particles $A_1$, which composition contained 82.2% by weight of Fe and 3.9% by weight of Co. It is assumed that the residual components were metal oxides, metal hydroxides, water and fatty acid salts. The grain size was such that the mean long axis was $0.15\mu$ and the means axial ratio was 7, and the magnetic properties were Hc: 950 Oe, SG: 0.50 and $\sigma s$: 160 emu/g.

On the other hand, an aqueous solution of iron, cobalt and chromium sulfates and an aqueous solution of sodium borohydride were reacted in a DC magnetic field to deposit a ferromagnetic metal powder, washed adequately with water and surface treated with sodium oleate, thus obtaining a chain-like ferromagnetic Fe-Co-Cr-B powder designated hereinafter as chain-like grains or particles $B_1$, which composition contained 58.3% of Fe, 19.7% of Co, 3.9% of Cr and 2.8% of B. It is assumed that the residual components were metal oxides, metal hydroxides and fatty acid salts. The grain size was such that the mean diameter was 250 Å and the mean long axis (length of eight grains chained in average) was about $0.15\mu$ and the magnetic properties were Hc: 950 Oe, SQ: 0.56 and $\sigma s$: 120 emu/g.

Using both the grains $A_1$ and $B_1$ obtained in this way, magnetic coating compositions were prepared according to the following recipes:

| Composition A | Parts |
| --- | --- |
| Acicular grains $A_1$ | 300 |
| Polyester polyurethane (molecular weight about 30,000) | 30 |
| Non-drying oil modified alkyd resin | 36 |
| Silicone oil | 3 |
| Solvent | 1000 |

| Composition B | Parts |
| --- | --- |
| Chain-like grains $B_1$ | 300 |
| Polyester polyurethane (molecular weight about 30,000) | 20 |
| Silicone oil | 2 |
| Non-drying oil modified alkyd resin | 24 |
| Solvent | 1000 |

The above described compositions A and B were individually ball milled for 10 hours, then mixed with 15 parts of a triisocyanate compound (Commercial name: Colonate L manufactured by Nippon Polyurethane Co.) and subjected to a high speed shearing dispersion for 1 hour to obtain magnetic coating compositions. From Composition A was obtained a magnetic coating composition A and from Composition B was obtained a magnetic coating composition B.

A multi-layer tape was then prepared by the following procedure using Magnetic Coating Composition A for a lower layer and Magnetic Coating Composition B for an upper layer. Magnetic Coating Composition A was coated onto one surface of a polyethylene terephthalate film having a thickness of $25\mu$ while applying a magnetic field, followed by heating and drying. The so obtained wide magnetic web was subjected to a supercalendering treatment. The thickness of the magnetic layer was $2.5\mu$. Then Magnetic Coating Composition B was similarly coated onto the magnetic layer while applying a magnetic field thereto, followed by heating and drying. The so obtained wide magnetic web was subjected to a supercalendering treatment and slit in a width of $\frac{1}{2}$ inch, thus obtaining a video tape. The thickness of the upper magnetic layer was $0.8\mu$ and the total thickness of the magnetic layers was $3.3\mu$. This tape is designated as Sample No. 1.

EXAMPLE 2

Using Magnetic Coating Compositions A and B of Example 1, the similar procedure was repeated except varying the thickness of the upper layer and lower layer as tabulated below, thus obtaining video tapes (Sample Nos. 2 to 6).

| Sample No. | Upper Layer | Lower Layer |
| --- | --- | --- |
| 2 | 1.5µ | 1.8µ |
| 3 | 2.0 | 1.2 |
| 4 | 4 | 2 |
| 5 | 2 | 4 |
| 6 | 0.8 | 5 |

COMPARATIVE EXAMPLE 1

A monolayer video tape was obtained using Magnetic Coating Composition A of Example 1. The thickness of the magnetic layer was 3.3µ after the supercalendering treatment. This tape is designated as Sample No. 7.

COMPARATIVE EXAMPLE 2

A monolayer video tape was obtained using Magnetic Coating Composition B of Example 1. The thickness of the magnetic layer was 3.3µ after the supercalendering treatment. This tape was designated as Sample No. 8.

The various properties of the video tapes obtained in Examples 1 and 2 and Comparative Examples 1 and 2 are tabulated below:

TABLE 1

| Sample No. | Bm (Gauss) | Br (Gauss) | SQ | Hc (Oe) |
| --- | --- | --- | --- | --- |
| 1 | 4000 | 3200 | 0.80 | 900 |
| 2 | 3900 | 3160 | 0.81 | 910 |
| 3 | 3750 | 3080 | 0.82 | 910 |
| 4 | 3710 | 3040 | 0.82 | 910 |
| 5 | 3950 | 3160 | 0.80 | 900 |
| 6 | 4050 | 3200 | 0.79 | 900 |
| 7 | 4300 | 3180 | 0.74 | 900 |
| 8 | 3500 | 2900 | 0.83 | 910 |

TABLE 2

| Sample No. | 5MHz[1] VS | 4.5MHz[2] MN | Chroma[3] Level | Quantity of Head Abrasiveness[4] | Durability[5] | Surface Smoothness[6] |
| --- | --- | --- | --- | --- | --- | --- |
| 1 | +3.6 dB | −4.9 dB | +3.9 dB | 78 | 100 | 160% |
| 2 | +3.4 | −5.1 | +3.1 | 70 | 95 | 170 |
| 3 | +3.4 | −5.2 | +3.1 | 65 | 85 | 180 |
| 4 | +3.3 | −4.8 | +3.9 | 60 | 55 | 195 |
| 5 | +3.3 | −4.5 | +4.0 | 66 | 80 | 185 |
| 6 | +3.1 | −4.1 | +4.0 | 80 | 100 | 180 |
| 7 | 0.0 | 0.0 | 0.0 | 100 | 100 | 100 |
| 8 | +3.1 | −5.0 | +3.0 | 69 | 10 | 150 |

Note:
[1] 5MHz VS (Video Sensitivity) Video output (sensitivity, when the sensitivity of Sample 7 is 0 dB.
[2] 4.5 MHz MN (Modulation Noise) Modulation noise when the sensitivity of Sample 7 is 0 dB. The noise is decreased with the increase of the minus value.
[3] Chroma Level when the output of Sample 7 is 0 dB.
[4] Quantity of head abrasiveness after running for a constant period of time, relative value when Sample 7 is 100.
[5] Durability Relative value of still time when Sample 7 is 100.
[6] Surface smoothness Reflection luminous intensity at 45° when the output of Sample 7 is 100.

In comparison of these results, it will clearly be understood that the multilayer magnetic recording substance of the present invention is more improved in sensitivity, noise, head abrasiveness and surface smoothness as compared with the monolayer magnetic recording substance (Sample 7) using the acicular grains and substantially similar or somewhat inferior thereto in durability, but can be practically used without troubles. The multilayer magnetic recording substance of the present invention is more improved in durability and surface smoothness as compared with the monolayer magnetic recording (sample 8) using the chain-like grains only and, in particular, the durability is largely improved, which is sufficient for practical use. The sensitivity is also improved.

As is evident from the above described results, the magnetic recording medium having the layer structure according to the present invention, each layer containing a ferromagnetic metal powder, has a high Bm and high Hc as well as a high sensitivity as expected and excellent utility.

EXAMPLE 3

An aqueous solution of iron, cobalt, nickel and barium chlorides and an aqueous solution of oxalic acid were mixed with agitation to precipitate a fine and acicular oxalate and washed adequately with water to thus obtain the oxalate grains. The resulting oxalate grains were then decomposed in a nitrogen stream at 360° C. and reduced with a hydrogen stream to obtain an acicular ferromagnetic metal powder ($A_2$), which composition contained 55.0% of Fe, 19.5% of Co, 6.9% of Ni and 4.6% of Ba. It is assumed that the residual components were metal oxides, hydroxides and water. The grain size was such that the mean long axis was 0.2µ and the mean axial ratio was 7 and the magnetic properties were Hc: 900 Oe, SQ: 0.46 and σs: 149 emu/g.

An aqueous solution containing cobalt sulfate, nickel sulfate, sodium citrate and sodium phosphinate was warmed at 80° C., mixed with an aqueous solution of sodium hydroxide to give a pH of 9.5 and reacted with a DC magnetic field. After about 20 seconds, a rapid reaction took place to form a black fine powder. After the reaction, this fine powder was adequately with water and then surface treated with sodium oleate to obtain a chain-like ferromagnetic metal powder $B_2$, which composition contained 68.0% of Co, 13.2% of Ni and 1.2% of P. The grain size was such that the mean diameter was 200 Å and the mean long axis was about 0.12µ and the magnetic properties were Hc: 1050 Oe, SQ: 0.54 and σs: 110 emu/g.

Using both the grains $A_2$ and $B_2$ obtained in this way, magnetic coating compositions were prepared according to the following recipe:

| Composition C | Parts |
| --- | --- |
| Acicular grains $A_2$ | 300 |
| Polyester polyurethane (molecular weight about 80,000) | 30 |
| Non-drying oil modified alkyd resin | 36 |
| Silicone oil | 3 |
| Solvent | 1000 |

| Composition D | Parts |
| --- | --- |
| Chain-like grains $B_2$ | 300 |
| Polyester polyurethane (molecular weight about 80,000) | 20 |
| Non-drying oil modified alkyd resin | 24 |
| Silicone oil | 2 |
| Solvent | 1000 |

The above described compositions C and D were individually ball milled for 10 hours; then mixed with 15 parts of a triisocyanate compound (Commercial name: Colonate L) and subjected to a high speed shearing dispersion treatment for 1 hour to obtain magnetic coating compositions. From Composition C was obtained a magnetic coating composition C and from Composition D was obtained a magnetic coating composition D. A video tape was then prepared in an analogous manner to Example 1. The thickness of the upper magnetic layer (Magnetic Coating Composition D) was 1.2μ and the total thickness of the magnetic layers was 5.5μ. This tape was hereinafter designated as Sample 9.

COMPARATIVE EXAMPLE 3

A monolayer video tape was obtained using Magnetic Coating Composition C of Example 3. The thickness of the magnetic layer was 5.5μ after the supercalendering treatment. This tape was designated as Sample 10.

COMPARATIVE EXAMPLE 4

A monolayer video tape was obtained using Magnetic Coating Composition D of Example 3. The thickness of the magnetic layer was 5.5μ after the supercalendering treatment. This tape was designated as Sample 11.

COMPARATIVE EXAMPLE 5

A video tape having a multilayer was prepared in a similar manner to Example 3 except using Magnetic Coating Composition D for the lower layer and Magnetic Coating Composition C for the upper layer. The thickness of the lower magnetic layer was 4.3μ, that of the upper layer was 1.2μ and the total thickness thereof was 5.5μ. This tape is designated as Sample 12.

The various properties of the video tapes obtained in Example 3 and Comparative Examples 3, 4 and 5 are shown in Table 3.

TABLE 3

| Sample No. | 5MHz$^A$ VS | 4.5MHz$^B$ MN | Chroma$^C$ Level | Quantity of Head Abrasiveness$^D$ | Durability$^E$ | Surface Smoothness$^F$ |
|---|---|---|---|---|---|---|
| 9 | +2.8 | −3.5 | +2.8 | 70 | 95 | 165 |
| 10 | 0.0 | 0.0 | 0.0 | 100 | 100 | 100 |
| 11 | +2.5 | −3.8 | +2.5 | 65 | 20 | 140 |
| 12 | +0.8 | −0.5 | +0.5 | 95 | 100 | 110 |

Note:
$^1$ to $^F$ have the similar meaning respectively to $^1$ to $^6$ of Table 2.
$^A$Sensitivity when the sensitivity of Sample No. 10 is 0 dB.
$^B$Value when the noise of Sample 10 is 0 dB.
$^C$Value when the output of Sample 10 is 0 dB.
$^D$Relative value when Sample 10 is 100.
$^E$Relative value when Sample 10 is 100.
$^F$Relative value when the output of Sample 10 is 100.

It is apparent from the results of Table 3 that the magnetic recording medium having a lower layer containing acicular grains and an upper layer containing chain-like grains according to the present invention is very excellent or well balanced in electromagnetic conversion characteristics and utility characteristics.

What is claimed is:

1. A magnetic recording medium comprising a nonmagnetic support and a magnetic layer provided thereon, the magnetic layer comprising a ferromagnetic metal powder and a thermoplastic or thermosetting binder and having a multilayer structure consisting of a lower layer wherein the ferromagnetic metal powder consists of acicular grains obtained by dry process reduction and containing 75% by weight or more of metallic components, the acicular grains having a grain size of 200 to 1000 Å along the short axis, an axial ratio of 3 to 30, Hc of 400 to 1500 Oe, σs of 100 to 180 emu/g, SQ of 0.4 or more and comprising at least one ferromagnetic metal selected from the group consisting of iron, cobalt, cobalt-nickel alloys, iron-cobalt alloys, iron-nickel alloys and iron-nickel-cobalt alloys; and an upper layer wherein the ferromagnetic metal powder consists of chain-like grains obtained by wet process reduction and containing 75% by weight or more of metallic components, the chain-like grains having a grain diameter of 150 to 800 Å, a mean length of 500 to 10000 Å, Hc of 600 to 2000 Oe, σs of 80 to 140 emu/g, SQ of 0.45 or more and comprising at least one ferromagnetic metal selected from the group consisting of iron, cobalt, cobalt-nickel alloys, iron-cobalt alloys, iron-nickel alloys and iron-nickel-cobalt alloys; the upper layer being provided on the lower layer.

2. The magnetic recording medium as claimed in claim 1, wherein the acicular grains are prepared by heat decomposing an organic acid salt of a ferromagnetic metal and then reducing with a reducing gas.

3. The magnetic recording medium as claimed in claim 1, wherein the acicular grains are prepared by reducing, with a reducing gas, a member selected from the group consisting of (1) an acicular oxhydroxide of iron, (2) an acicular oxhydroxide of iron containing another metal selected from the group consisting of cobalt, nickel, manganese and chromium and (3) an acicular iron oxide derived from the oxyhydroxide of (1) and (2).

4. The magnetic recording medium as claimed in claim 1, wherein the chain-like grains further contain at least one element selected from the group consisting of chromium, lead, titanium, manganese, boron, phosphorus, sulfur, copper, tin, aluminum, silicon, zinc, molybdenum, palladium, barium, silver, lanthanum, cerium and samarium in a proportion of at most 10% by weight.

5. The magnetic recording medium as claimed in claim 1, wherein the chain-like grains are prepared by reducing a solution containing a ferromagnetic metal salt with a reducing agent the reducing agent being selected from the group consisting of phosphinates, borohydrides, hydrides, hydrazine or its derivatives and mixtures thereof.

6. The magnetic recording medium as claimed in claim 1, wherein the magnetic layer is provided by dispersing the ferromagnetic powder in a binder and then applying to the nonmagnetic support.

7. The magnetic recording medium as claimed in claim 6, wherein the binder is at least one material selected from the group consisting of thermoplastic resins and thermosetting resins.

8. The magnetic recording medium as claimed in claim 1, wherein the upper layer has a thickness of at most 6 microns and the lower layer has a thickness of at most 12 microns, the thickness of the upper layer being half or less of that of the lower layer.

9. The magnetic recording medium as claimed in claim 1, wherein the upper layer has a larger coercive force than the lower layer by at least 200 Oe.

10. The magnetic recording medium as claimed in claim 1, wherein the support has a thickness of 5 to 50 microns.

11. The magnetic recording medium as claimed in claim 1, wherein said lower layer and said upper layer each comprise the ferromagnetic metal powder and thermoplastic or thermosetting binder in a proportion of 10 to 400 parts by weight binder to 100 parts by weight ferromagnetic powder.

* * * * *